Sept. 26, 1950
M. HURWITZ ET AL
2,523,533
COLLAPSIBLE STRUCTURE
Filed Dec. 13, 1945
3 Sheets-Sheet 1
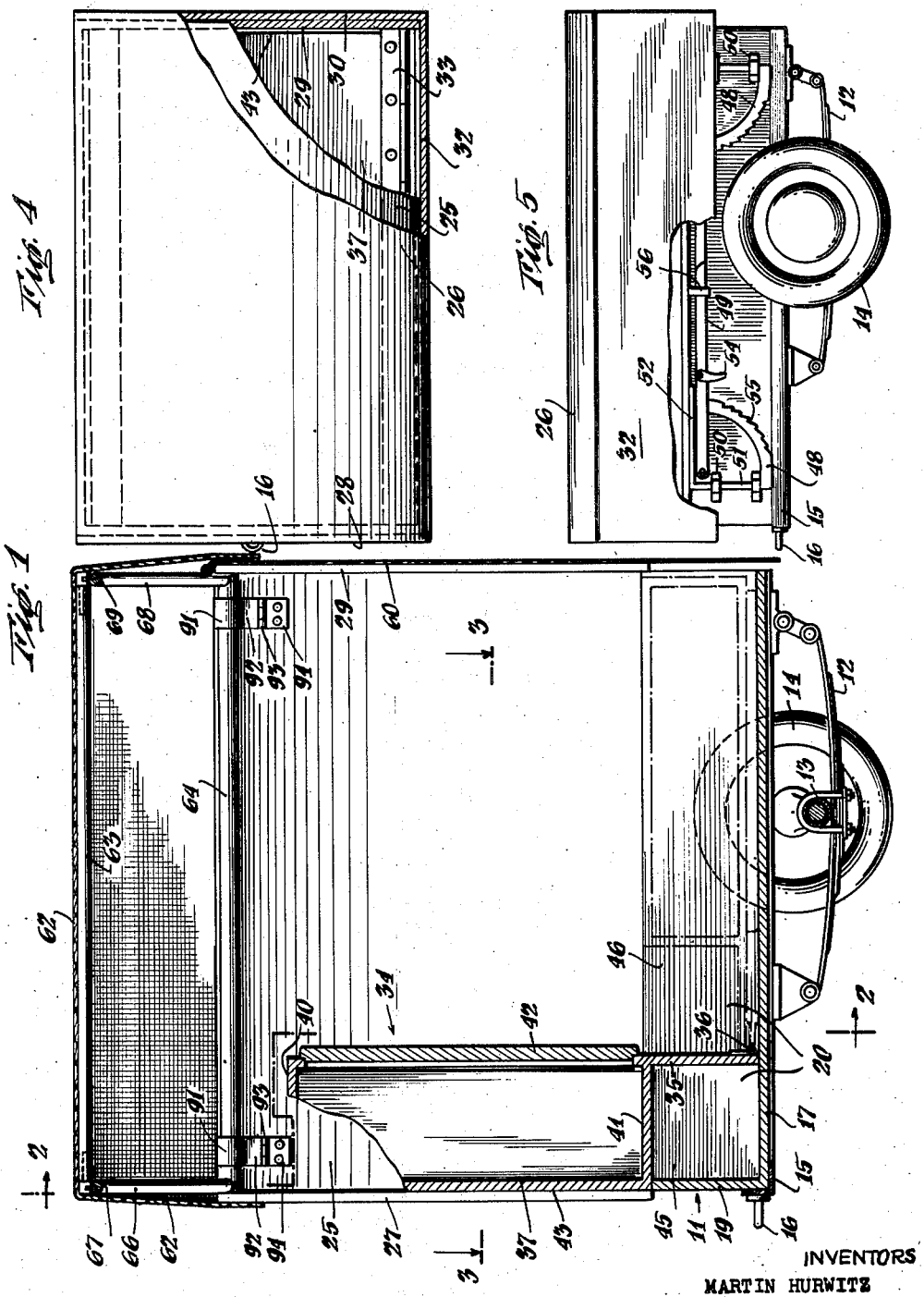
INVENTORS
MARTIN HURWITZ
JACOB HURWITZ
BY Hobart N. Durham
ATTORNEY Sept. 26, 1950　　　M. HURWITZ ET AL　　　2,523,533
COLLAPSIBLE STRUCTURE
Filed Dec. 13, 1945　　　　　　　　　　3 Sheets-Sheet 2
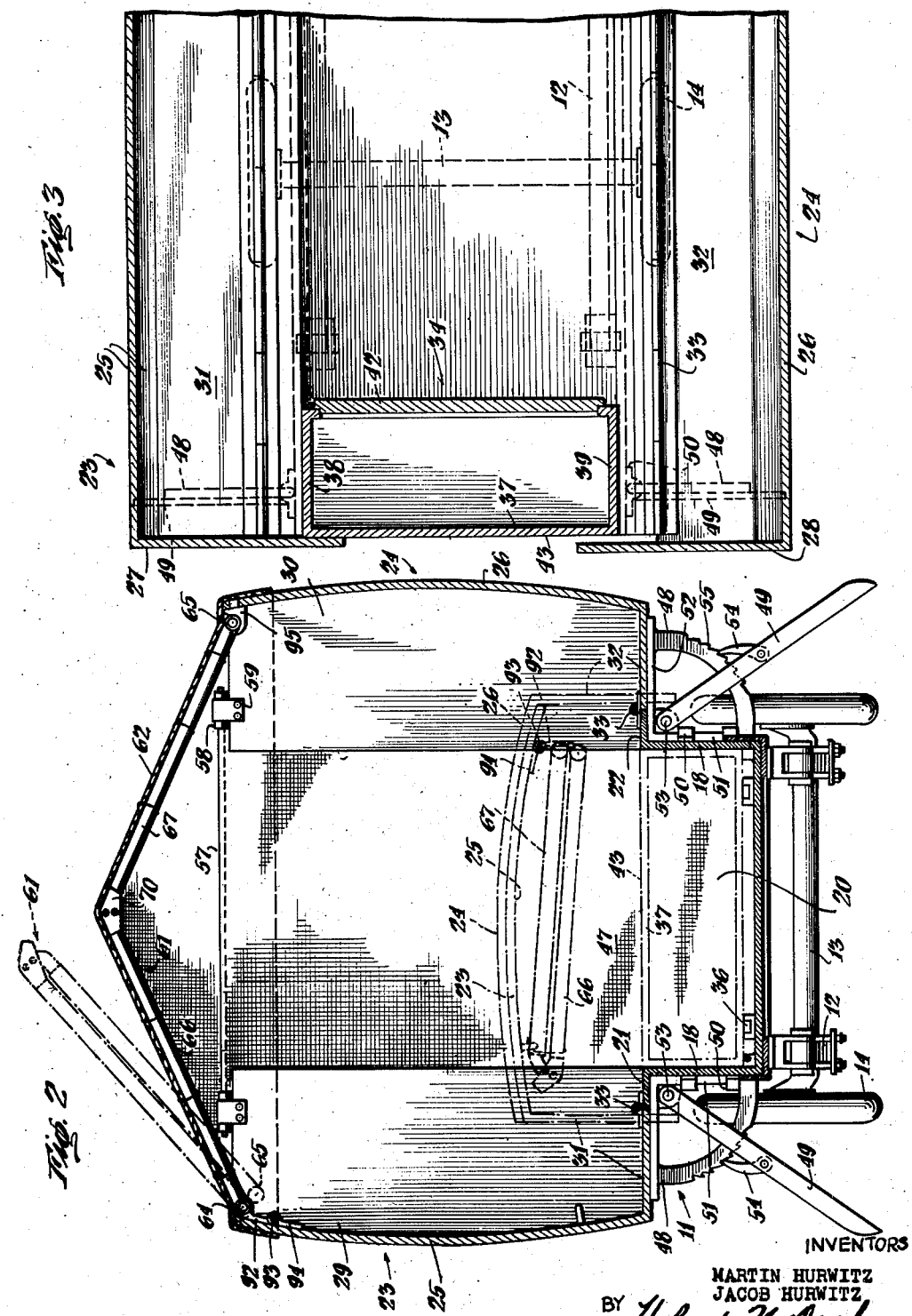
INVENTORS
MARTIN HURWITZ
JACOB HURWITZ
BY Hobart N. Durham
ATTORNEY Sept. 26, 1950   M. HURWITZ ET AL   2,523,533
COLLAPSIBLE STRUCTURE
Filed Dec. 13, 1945   3 Sheets-Sheet 3
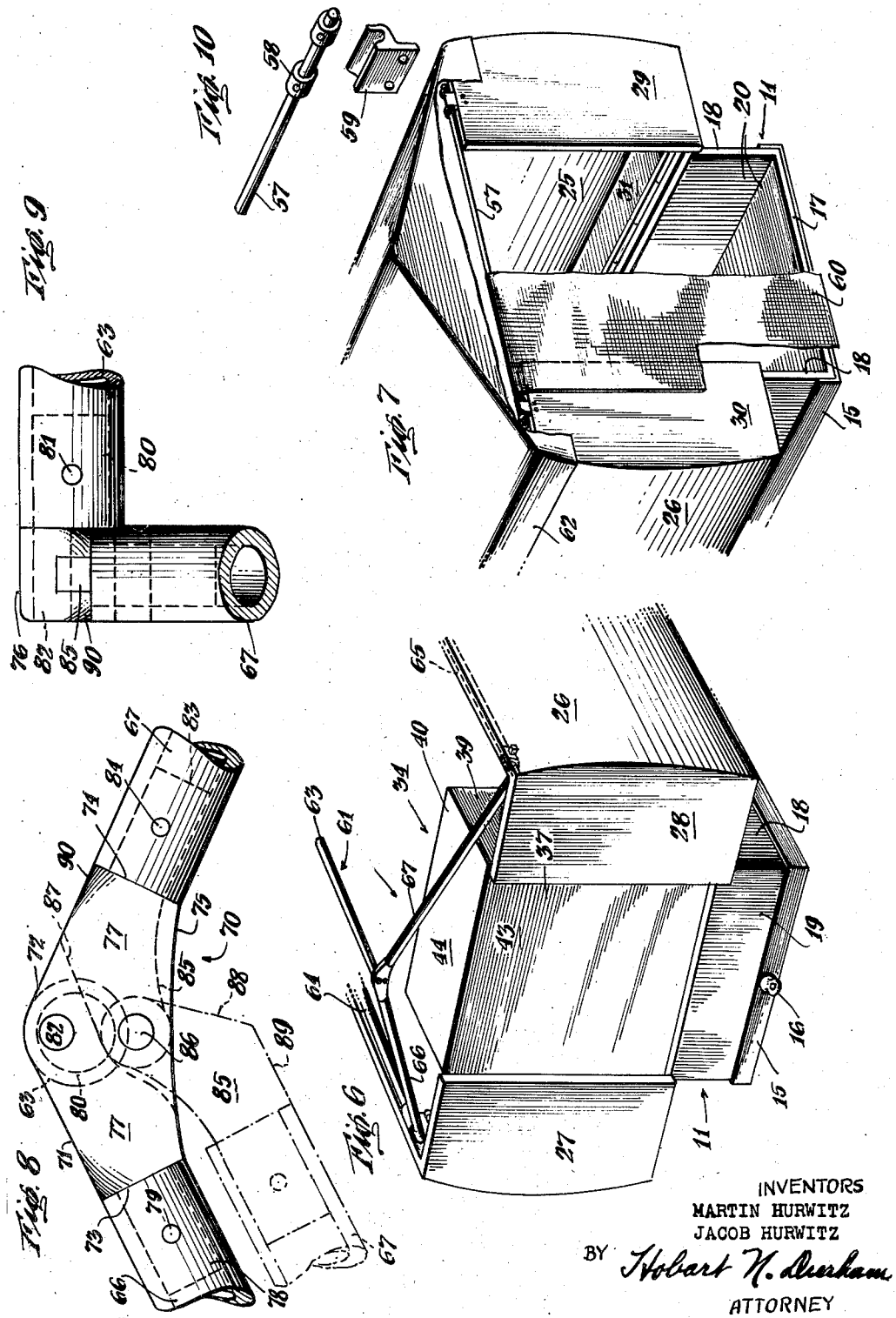
INVENTORS
MARTIN HURWITZ
JACOB HURWITZ
BY Hobart N. Durham
ATTORNEY Patented Sept. 26, 1950

2,523,533

UNITED STATES PATENT OFFICE 2,523,533

COLLAPSIBLE STRUCTURE

Martin Hurwitz and Jacob Hurwitz,
Brooklyn, N. Y.

Application December 13, 1945, Serial No. 634,681

3 Claims. (Cl. 296—23)

1

The present invention concerns a collapsible structure and relates more particularly to a device suitable as an automotive vehicle trailer.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Figure 1 is a vertical longitudinal section of the device embodying the present invention in the erected position;

Figure 2 is a vertical lateral section of the same, along the line 2—2 of Figure 1, showing in broken lines the relation of parts when collapsed;

Figure 3 is a longitudinal horizontal section taken on the line 3—3 of Figure 1;

Figure 4 is a top elevation, partly broken away, of the structure in collapsed position;

Figure 5 is a side elevation of the same, also partially broken away;

Figure 6 is a fragmentary perspective view of the front end and left side of the structure in the erected position and with the canvas roof covering removed;

Figure 7 is a perspective view of the rear end and left side of the erected structure;

Figure 8 is an end view of the ridge pole joint of the roof structure;

Figure 9 is a side view of the same; and

Figure 10 is an exploded view of the mounting means for the rear curtain.

The present invention has for its principal object the provision of a collapsible trailer for use with pleasure automobiles which shall be very roomy when erected and of very simple construction.

A further object is that the trailer when collapsed shall be low enough to permit conventional use of the automobile's interior rear-view mirror in which, as is well known, the line of vision passes through the rear window of the car.

A further object is the provision of interre-

2 lated body members adapted to nest one within the other in collapsed position in a novel manner.

A further object is that the operations of erecting and collapsing the structure shall require little skill and physical exertion.

A further object is the provision of considerable storage space within the collapsed structure.

Other objects will become apparent in the course of the following specification.

In accordance with the illustrative embodiment of the present invention there is provided a main body member resiliently mounted on a dead axle in conventional trailer fashion. This member comprises a floor portion and lower side wall portions jointly defining a floor well, and fender portions extending laterally from the top of the lower sidewalls and at least partially over the trailer wheels. Side members of the structure each comprise in rigidly connected relation side wall portions, partial end wall portions, and horizontal platform portions, the latter being hingedly connected to the fender portions of the main body member. The interior surfaces of the platform and fender portions are continuous and together constitute comfortable seat or bed surfaces. Exterior supporting members for the side members are vertically hingedly connected to the lower sidewall portions and swing out beneath the platform portions for support, and in under the fender portions in the collapsed or travelling position of the trailer. The side members are of corresponding size and shape, so that one fits closely but easily over the other when they are folded inwardly approximately ninety degrees.

The roof of the structure is of canvas or similar material supported on a tubular metal frame comprising a ridge pole, side poles and end poles connecting the ridge to the side poles, a special joint being provided between the ridge and end poles in order to permit the roof frame to fold and unfold while maintaining substantial continuity of the upper surfaces of the frame in and while approaching the unfolded position.

The frame is hinged at one side to the side member which first folds down, so that the frame is brought substantially parallel to the side wall portion and hooked there, leaving considerable space interiorly of the side member in collapsed position.

A lower front wall of the main body member extends to a height equal to that of the lower side walls, and the upper central front wall of the erected structure is constituted by the rear wall of a rearward facing cabinet hinged to the floor and dimensioned to fill the height and width of the floor well when collapsed rearwardly, the top of the cabinet then coming even with the rear end of the main body and constituting a closure of the floor well. Storage space is available in the floor well forward of the collapsed cabinet.

Entrance to the erected structure is by way of an opening in the rear end defined by the lower side walls and the partial rear end wall portions. This opening is closed by a canvas or similar curtain suspended from a rod having a pair of collars at each end, the collars being adapted to engage upwardly open semi-cylindrical bearing fixtures mounted on the rear wall portions. The rod is thus adapted to interconnect the two side members so as to prevent relative movement between them axially of itself, while being readily removable for collapsing of the structure.

It will be understood that the foregoing general description and the following detailed description as well are exemplary and explanatory of the invention but are not restrictive thereof.

Referring now to the illustrative embodiment of the invention as shown in the drawings, the main body member 11 is resiliently mounted as by conventional semi-elliptic laminated leaf springs 12 on a bent dead axle 13 mounting trailer wheels 14. Body 11 has a structural steel frame 15 provided with an eye 16 or other means for coupling to an automotive vehicle.

Body member 11 comprises a floor portion 17, lower side wall portions 18 and lower front wall portion 19, together defining a floor well 20. Fender portions 21, 22, extend laterally outwardly from the top of lower side wall portions 18, and at least partially over the wheels 14.

Side members 23, 24 respectively comprise in rigidly connected relationship side wall portions 25, 26, partial front wall portions 27, 28, partial rear wall portions 29, 30 and platform portions 31, 32, the latter being respectively connected by piano type hinges 33 to the fender portions 21, 22 to form substantially continuous plane surfaces 21—31 and 22—32 suitable as seats or beds.

The side wall portions are slightly bowed outwardly and may be considered as segments of cylinders with axes extending longitudinally of the structure. The interior concave surfaces of the walls 25, 26 are thereby better adapted to serve as back rests when the surfaces 21—31 and 22—32 are used as seats, while the exterior convex surface of wall 26 is also thereby better adapted to shed rain when it becomes the complete top surface of the collapsed structure as shown in Figures 2, 4 and 5. Side member 23 is slightly shorter and lower than member 24 so as to nest within it in collapsed position, as clearly shown in Figures 3 and 4, the parts of member 23 lying parallel to and immediately adjacent the corresponding parts of member 24, except of course that the corresponding portions 31, 32 lie parallel but not immediately adjacent each other, member 24 enveloping member 23 on the top and ends and on the right of Figure 2 in broken lines, and the word "nest" as used herein being understood to include such envelopment.

A cabinet 34 is uniquely constructed and mounted to serve a multiplicity of purposes. A leg or base-board portion 35 thereof is pivotally connected as by hinge 36 to floor 17. Cabinet 34 further comprises a rear wall portion 37, side wall portions 38, 39, top portion 40, bottom portion 41 and a door portion 42 facing or opening rearwardly of the structure. With the cabinet erected as shown in the full line position of Figures 1, 3 and 6, the outer surface 43 of the cabinet rear wall 37 serves as a partial front wall portion of the erected structure, while in the folded or collapsed position, the outer surface 44 of the cabinet top portion 40 serves as a partial closure member of the structure as shown in Figure 4 and in broken lines in Figure 1, and constituting a complete closure of the rear opening of floor well 20. Cabinet 34 may be used as a clothes closet or for the storage of other articles which would not be damaged by the change in position from vertical to horizontal. The space 45 below the erected cabinet may be provided with a bin for food storage or the like, or may be left open so as to connect with space 46 immediately to the rear thereof in floor well 20 for the storage of larger articles such as luggage when the structure is folded. A further luggage space 47 is available above the folded cabinet rear wall 37 and fender portions 21, 22, as shown in Figure 2.

Rigid support and locking means for the side members 23, 24 in erected position and ground engaging means for body 11 are provided in the form of quarter circular ratchet wings 48 comprising outrigger legs 49. Wings 48 are pivotally attached as at 50 along their substantially vertically extending radial portions 51 to body lower side portions 18, so that when they are swung into operative position as in Figure 2 their horizontal radial portions 52 engage the under surfaces of the fender and platform portions 21—31, 22—32 to support the same. Outrigger legs 49 are pivoted to wings 48 as at 53 and have pivoted, spring actuated pawl fingers 54 adapted to engage the teeth 55 of wings 48. When not in use wings 48 and legs 49 swing in under fenders 21, 22 and are fastened as at 56 Figure 5.

Part of the means for locking side members 23, 24 in erected position, and cooperating with wings 48 to that purpose, is the lock bar 57 comprising a pair of collars 58 at either end. Each pair of collars is adapted to fit over the ends of substantially semi-cylindrical upwardly open lugs or bearings 59 mounted on the rear wall portions 29, 30. Relative movement between members 23, 24 axially of lock bar 57 is thereby prevented. Lock bar 57 further serves as a mounting for a canvas or similar door flap 60 which may be rolled thereon for storage or partially unrolled therefrom like a window shade, or fully unrolled as in Figure 7.

The roof structure comprises a light tubular metal frame or skeleton 61 over which is laid a canvas or similar waterproof covering 62. Frame 61 comprises longitudinally extending ridge pole 63, side poles 64, 65 and laterally extending end poles 66, 67, 68, 69. The end poles are connected together and to the ridge pole by a special joint member 70 providing firm connection of the ridge pole 63 to the end poles 66, 68 of the same side of the roof, whereby a rigid rectangle is formed constituting one-half of the roof frame. End poles 67, 69 are pivotally connected to the joint members 70 on an axis lying below the ridge pole axis and outside the prolongation of the end poles 66, 67, 68, 69, constituting the other half of the roof frame a rectangle whose three outer sides may be folded inwardly and down to lie substantially parallel to the corresponding sides of the first half of the frame.

Joint members 70, as best shown in Figure 8, are of irregular pentagonal front elevation, having top boundaries 71, 72 in prolongation of the top surfaces of the end poles 66, 67, 68, 69, side boundaries 73, 74 substantially perpendicular to the respective adjacent top boundaries, and a bottom boundary 75 connecting the side boundaries. A top boundary line 76 is shown in side elevational Figure 9 as being in prolongation of the top boundary of ridge pole 63. The front surface 77 and top surfaces indicated by the boundary lines 71, 72, 76 of Figures 8 and 9 may conveniently be flat except for rounded corners as they merge into one another and into the semi-cylindrical upper surfaces of the end poles 66, 67, 68, 69. A joint member is thus provided between ridge pole and end poles which presents supporting surfaces for the flexible covering member 62 continuous with the upper surfaces of the joined poles.

Plugs 78 are preferably integral with joint members 70 and are shown as fixed in the end poles 66, 68 by pins 79. Plugs 80 are fitted into the ends of ridge pole 63 and fixed in position by pins 81. Plugs 80 have integral eccentric portions 82 of reduced diameter and having upper boundaries common with the body portions of plugs 80. Alternatively the plugs 80 may be formed integral with joint members 70.

Cylindrical plugs 83, held in end poles 67, 69 by pins 84, are integral with elbow joints 85 which are of substantially rectangular cross section and are pivotally mounted on pins 86 in joint members 70. It will be noted that the axis of pivot pins 86 lies outside the prolongation of end poles 66, 67, 68, 69, whereby the poles on the right side of the drawings are enabled to fold inwardly and downwardly into substantially parallel relationship to those on the left, as shown in broken lines in Figures 2 and 8.

Joint members 70 are recessed to receive elbows 85, and have interior surfaces 87 against which corresponding exterior surfaces 88 of elbows 85 bear to limit the upward and outward movement of the latter. Elbows 85 further have top surfaces 89 extending in prolongation of the top surfaces of end poles 67, 69 to prevent pinching of the flexible covering member 62 as the frame is approaching erected position and member 62 is lying thereon as will be more fully described hereafter. Pinching of member 62 is further prevented by the free outer ends 90 of joint member 70 which extends parallel to and on either side of top surfaces 89 in the erected position of the frame.

Side pole 64 is pivotally engaged near either end by straps 91 in which it is free to rotate. Straps 91 have portions 92 extending downward to hinges 93 which join them to leaf portions 94 affixed to wall portion 25. Side pole 65 is cradled at either end in the upwardly open semi-cylindrical bracket 95 which is removable for compact folding of side member 24 over side member 23.

The mode of operation of the invention will now be described, commencing with the structure hingedly collapsed as shown in Figures 4 and 5 and in broken lines in Figure 2. Ratchet wings 48 are first swung into the laterally extending operative position of Figure 2, and side members 24 and 23 are successively folded upwards and outward until the platform portions 31, 32 rest on wings 48. Lock bar 57 is now dropped into place, the collars 58 engaging lugs 59 to prevent accidental inward folding of the side members 23, 24, as by the wind, before the structure is completely erected and locked together.

Any luggage or other material which may have been stored in the spaces 47, 46 is then removed and other articles which will not be needed until the structure is again collapsed are placed in the space 45, and cabinet 34 is erected by swinging upwardly and forwardly on hinge 36. Cabinet 34 is then detachably connected to partial front wall portions 27, 28 by any convenient fastening means, the outer surface 43 of cabinet wall 37 thereby becoming a front wall surface of the structure.

The ground engaging outrigger legs 49 have automatically fallen to operative position upon being released after wings 48 were operatively positioned. It will be seen from Figure 2, by reason of the number of ratchet teeth 55 both above and below pawls 54 when legs 49 are in engagement with substantially level terrain, that any leg 49 can be locked in a higher or lower position by pawl 54 and engagement with higher or lower portions of uneven surrounding terrain. The present stage of erection of the structure is appropriate for rocking the body laterally to ensure that each leg 49 reaches the lowest possible position so as to afford maximum support through wings 48 to platforms 31, 32 and the structure generally. Once this condition is established the automobile or other source of motive power may be disconnected from eye 16 if desired.

Brackets 95 are next inserted in place in wall portion 26. The roof frame 61 now occupies the same position relative to side member 23 as in the broken line position of those members in Figure 2. As the entire frame is swung upward around hinges 93 the roof covering member 62 goes up with it, as covering 62 is preferably permanently attached to frame 61, there being a certain looseness in the attachment to poles 65, 67, 69 so that member 62 may slide along end poles 67, 69 and always be smooth but never stretched in the various positions of frame 61. One person standing in the floorwell 20 may grasp side pole 65 and by stepping upon the surface 22—32, place pole 65 in brackets 95.

To collapse the structure, pole 65 is removed from brackets 95 by a person standing on surface 22, 32. Frame 61 is lifted upward until cover member 62 clears the various wall portions of side member 24, then the person steps down into floorwell 20, and up onto the surface 21—31 to bring poles 65, 67, 69 to the upper broken line position of Figure 2, when frame 61 is ready to fold down substantially parallel to wall portion 25 around strap 91 and hinge 93. The remainder of the operation of hingedly collapsing the structure is clear from the description of erecting the same.

It will be noted that in the collapsed or inwardly folded position of the members, wall portions 25, 26 are substantially parallel, side member 23 is compactly nested within member 24, and frame 61 is folded and hooked substantially parallel with wall portion 25, whereby the substantial luggage space 47 is made available, extending from side to side of the collapsed structure as defined by the upturned platforms 31, 32, and between frame 61 and surface 43 of cabinet 34 which is substantially continuous with the upper surfaces of fender portions 21, 22 and together with them forms the floor of space 47.

The invention in its broader aspects is not limited to the specific mechanisms shown and described but departures may be made therefrom within the scope of the accompanying claims without departing from the principles of the invention and without sacrificing its chief advantage.

What is claimed is:

1. In a collapsible structure the combination with a main body portion and side members pivotally connected to said body portion and foldable inwardly from an erected position to nest compactly one within the other, of a roof structure comprising a frame portion and a flexible covering member, said frame portion having longitudinally extending ridge and side pole members, laterally extending end pole members, and joint members rigidly connecting said ridge pole to two end pole members on the same side of said frame, the other end pole members being pivotally connected to said joint member, the axis of said pivotal connection lying outside the prolongation of all of said end pole members, whereby the halves of said frame portion are foldable into substantially parallel relationship, said joint members further providing supporting surfaces for said cover member substantially continuous with the upper surfaces of said ridge and end pole members.

2. A collapsible vehicle comprising, in combination with a main body portion comprising lower side wall portions and fender portions extending laterally outwardly from the top of said lower side wall portions, side members, and a cabinet member, said side members each comprising in rigidly connected relationship a side wall portion, partial end wall portions, and a platform portion hingedly connected to a corresponding fender portion and substantially continuous therewith in the erected position of said side members, said side members being foldable inwardly to nest compactly one within the other, said cabinet member being pivotally connected to said main body portion and swingable from an erected to a collapsed position, the rear wall of said cabinet in the erected position constituting a partial fornt wall portion of said vehicle, said rear wall further constituting in the collapsed position a surface continuous with said fender surfaces to form a floor of a luggage compartment extending above said floor and said fender portions, the top surface of said cabinet in the erected position further constituting a partial rear closure member of said vehicle in the collapsed position of said cabinet.

3. In a collapsible structure of the type comprising a main body portion and side members pivotally connected thereto, said side members comprising side wall portions, said side members further being foldable inwardly from an erected position to nest compactly one within the other, the improvement comprising a roof portion, said roof portion comprising two longitudinally extending half portions, one of said half portions being pivotally connected to one of said side wall portions, the other of said half portions being pivotally connected to said first mentioned half portion, whereby said roof portion is foldable into two substantially parallel, substantially immediately adjacent portions, said roof in said folded condition further being foldable into said side member to which it is connected, said roof in said last mentioned position being substantially parallel to said side wall portion.

MARTIN HURWITZ.
JACOB HURWITZ.

REFERENCES CITED

The following references are of record in the file of this patent:

UNITED STATES PATENTS

| Number | Name | Date |
|---|---|---|
| 1,247,282 | Kline | Nov. 20, 1917 |
| 1,564,257 | Lippman | Dec. 8, 1925 |
| 1,748,809 | Verdini | Feb. 25, 1930 |
| 1,864,047 | Lawhorne | June 21, 1932 |
| 2,003,816 | Allen et al. | June 4, 1935 |
| 2,383,192 | Heil | Aug. 21, 1945 |

FOREIGN PATENTS

| Number | Country | Date |
|---|---|---|
| 324,667 | Great Britain | Jan. 31, 1930 |
| 390,599 | Great Britain | Apr. 13, 1933 |
| 103,814 | Australia | Apr. 26, 1938 |
| 503,627 | Great Britain | Apr. 12, 1939 |